United States Patent [19]

Denzin

[11] 4,341,061
[45] Jul. 27, 1982

[54] REEL-TYPE STUBBLE CONDITIONING DEVICE

[76] Inventor: Warren Denzin, R.R. #1, Regina, Saskatchewan, Canada

[21] Appl. No.: 196,603

[22] Filed: Oct. 14, 1980

[30] Foreign Application Priority Data

Nov. 28, 1979 [CA] Canada ................................. 340827

[51] Int. Cl.³ ........................................... A01D 43/00
[52] U.S. Cl. .................................... 56/192; 56/13.8; 56/14.4; 56/DIG. 1
[58] Field of Search ........ 56/192, DIG. 19, DIG. 21, 56/DIG. 1, DIG. 2, 14.3, 14.4, 13.6, 13.7, 13.8

[56] References Cited

U.S. PATENT DOCUMENTS

| 1,677,250 | 7/1928 | Ritter | 56/13.8 |
| 3,325,982 | 6/1967 | Fogels et al. | 56/14.3 |
| 3,555,790 | 1/1971 | Quick | 56/14.4 |
| 3,754,384 | 8/1973 | Case et al. | 56/DIG. 1 |
| 4,037,390 | 7/1977 | Vogelenzang | 56/192 |
| 4,188,773 | 2/1980 | Kaetzel | 56/192 |

Primary Examiner—Robert A. Hafer
Attorney, Agent, or Firm—Stanley G. Ade

[57] ABSTRACT

A frame assembly mounted in the windrow discharge area on a swather or windrower on which a plurality of vertical assemblies, are mounted thereto. On these assemblies are mounted fraying and cutting blades. These blades are operated at a required speed to fray and distort the tips of the stubble and/or cut and reduce the length of the straw of the standing stubble so as to ensure that the supportive strength of the straw is not exceeded by the weight of the swath or windrow placed upon it. This will eliminate any distortion or buckling of the remaining conditioned standing stubble straws. A windrow delivery plate is mounted on the swather frame assembly within the windrow discharge area. This plate assures delivery of the windrowed material onto the swath support fingers which effect a gradual release of the windrowed material onto the remaining standing frayed and conditioned stubble directly behind the frayer conditioners track of travel in the field. The conditioned stubble height is controlled by a cantilever mechanism.

7 Claims, 8 Drawing Figures

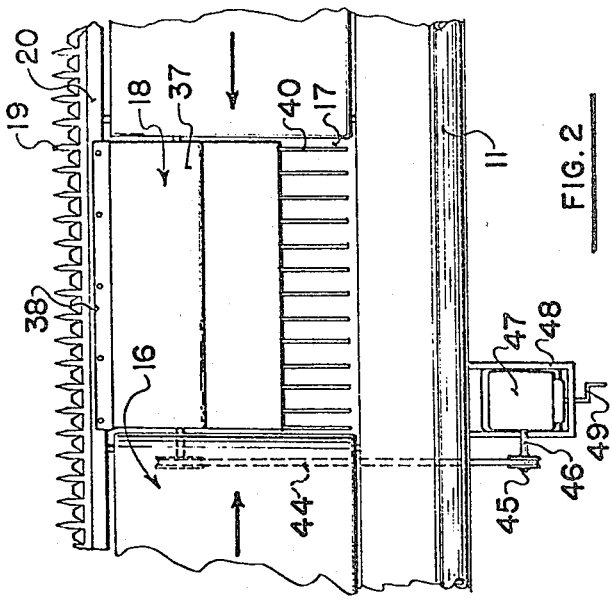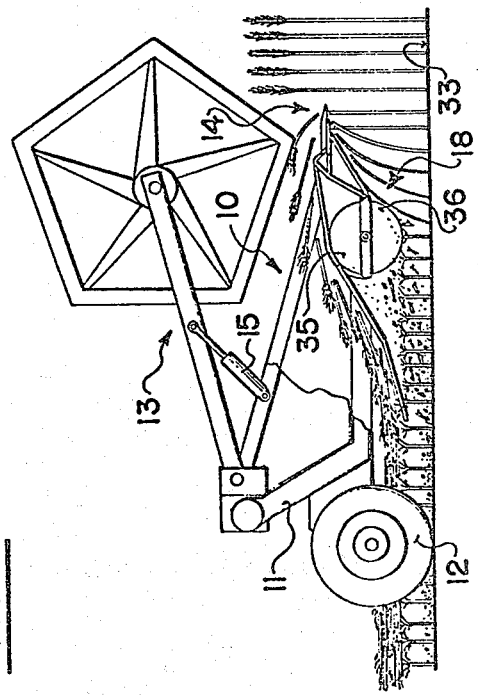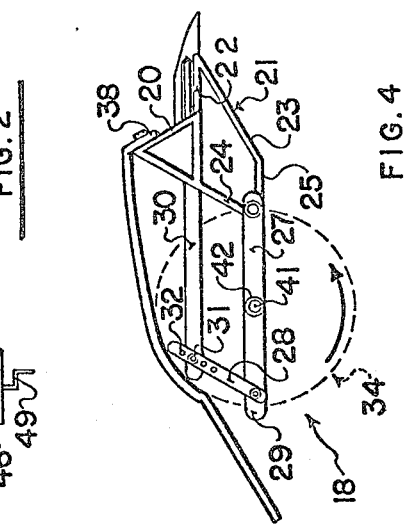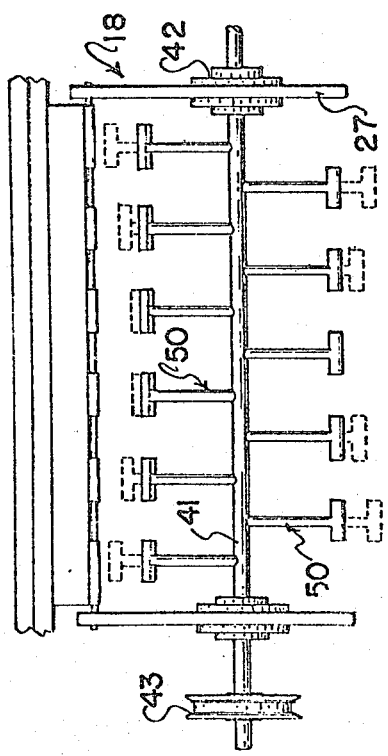

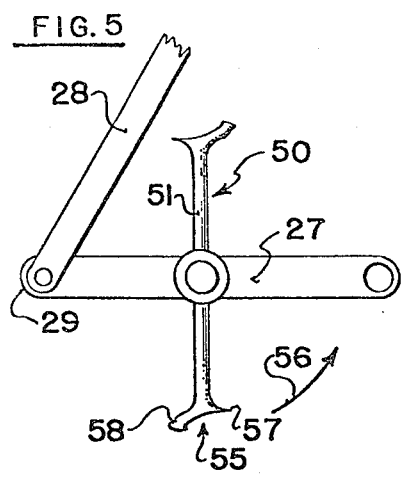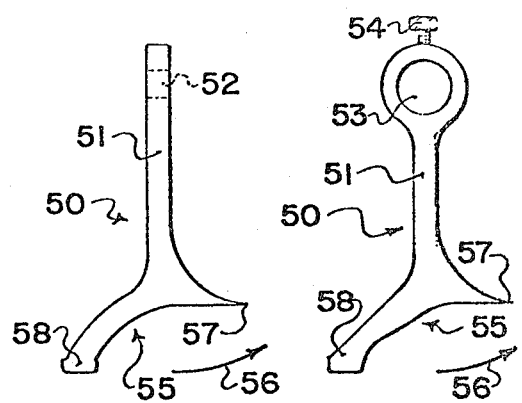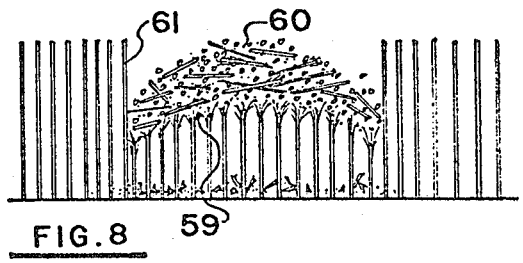

REEL-TYPE STUBBLE CONDITIONING DEVICE

BACKGROUND OF THE INVENTION

This invention relates to new and useful improvements in stubble conditioning devices particularly designed for use with farm implements such as swathers, windrowers or the like in which the grain is cut with a predetermined length of straw and then deposited in a swath behind the machine so that it can be air conditioned prior to threshing.

It will be appreciated that the straw length of growing grain varies depending upon the variety, the type of grain and weather conditions encountered during the growing season and such straw lengths may vary, for example, from relatively short up to a height of approximately 30 inches.

From a theoretical standpoint, it will be appreciated that the shortest possible length of straw is desired upon the grain heads after swathing and prior to threshing so that the volume of straw does not interfere with the threshing action of a combine. For example if the stubble is cut relatively short by the swather, then a relatively large volume of straw will have to be processed by the thresher or combine which interferes with efficient action of the concave and separation assemblies.

While it is appreciated that the cutter bar assemblies of swathers can be raised so that the straw length can be controlled, nevertheless it will also be appreciated that it is not desirable to leave relatively long straw stubble which although advantageous to fertility, nevertheless causes considerable problems by not supporting the windrow adequately.

Furthermore, relatively long straw stubble does not support a swath efficiently, because the weight of the swath forces the long stubble downwardly so that good air circulation is not possible. Another disadvantage of long straw stubble is the difficulty in picking up the swath therefrom when threshing or combining due to buckling and flattening of the swath or windrow supporting stubble.

Known prior art includes U.S. Pat. No. 1,905,409 which shows a "trough swather" but without any conditioning of the stubble in the swath path and U.S. Pat. No. 2,850,681 which teaches a similar result. U.S. Pat. No. 1,944,750 illustrates a system which includes the laying of a mat of straw on the stubble in order to support the swath which is then subsequently laid on top of the mat.

Canadian Pat. No. 328857 is also a "trough swather" giving a result similar to U.S. Pat. No. 1,905,409.

Canadian Pat. No. 321071 shows a structure in which the rear edge of a stationary pan engages the tops of the stubble and deflects them over to receive the swath, the weight of which proposes to hold the ends in the bent position. However, this is problematical and certainly cannot be called conditioning of the stubble.

SUMMARY OF THE INVENTION

The present invention overcomes these disadvantages by providing a device for conditioning the stubble upon which the swath is to be laid and cutting same below the level of the surrounding stubble to provide a platform upon which the swath can be laid so that it is situated at a lower level than it would be if it was supported upon the normal height stubble. This provides a shielded location for the swath and the conditioning of the upper ends of the cut stubble provides a platform which assists in supporting the swath laid thereon.

Another advantage of the present invention is to provide a device of the character herewithin described which may be provided with means whereby the cut and conditioned stubble is "crowned" not only assisting in moisture shedding but also in air circulation for drying and conditioning purposes.

Another advantage is to provide a device of the character herewithin described in which the conditioned stubble is at a level below the surrounding stubble so that the swath is sheltered against lifting and scattering by high winds.

In accordance with the invention there is provided in a swather which includes a frame, a transverse cutter bar assembly for cutting a swath including a transverse cutter bar support member, a canvas assembly, and a swath discharge area at one end of the canvas of said canvas assembly; the improvement comprising a stubble conditioning assembly below said swath discharge area for conditioning the tops of the stubble over which the swath is to be deposited, said swather conditioning assembly including a horizontally located stubble cutting and conditioning reel component journalled for rotation within and below the swath discharge area and means supporting said reel component from the frame of the swather, said conditioning reel component including swather guide shield means over the upper side thereof for receiving the swath from the swath discharge area and depositing same upon the conditioned stubble therebehind, and means operatively connecting said reel to a source of power.

In accordance with the invention there is provided a method of conditioning stubble for receiving and supporting a swath laid thereon consisting of the steps of rotating a conditioning reel, cutting the stubble by said reel at a height below the surrounding stubble, and then conditioning the upper ends of said cut stubble also by said reel.

Another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred embodiment of the principles of the present invention, in which:

DESCRIPTION OF THE DRAWINGS

FIG. 1 is a partially schematic side elevation of a swather with the invention incorporated therein.

FIG. 2 is a fragmentary top plan view of the swather discharge area with the invention installed therein.

FIG. 3 is a fragmentary plan view of FIG. 2 with the top plate and shroud removed showing the interior of the device.

FIG. 4 is a fragmentary enlarged view showing one method of mounting the invention within the swath discharge area.

FIG. 5 is a fragmentary end elevation of the cutting and conditioning reel.

FIG. 6 is an enlarged side elevation of one embodiment of the cutter and beater member.

FIG. 7 is a vew similar to FIG. 6 but showing an alternative method of securing same to the central shaft.

FIG. 8 is partially schematic cross sectional view of stubble supporting a swath thereon.

In the drawings like characters of reference indicate corresponding parts in the different figures.

DETAILED DESCRIPTION

One of the advantages of the present invention is the fact that it can be incorporated when the swather or similar device is manufactured or, alternatively, can be attached to existing swathers whether they be of a central delivery type or an end delivery type.

The swather collectively designated 10 includes general supporting framework 11, ground engaging supporting wheels 12 and a reel assembly collectively designated 13. A cutter bar assembly 14 is also situated adjacent the front side of the swather and the relationship of the reel to the cutter bar may be adjusted by means such as hydraulic piston and cylinder assemblies collectively designated 15.

FIG. 2 shows a fragmentary top plan view of the swather in which a pair of delivery canvases collectively designated 16 deliver the cut grain to a centrally located swath discharge area 17 and the invention collectively designated 18, is situated within this swath discharge area to condition the line or area of stubble therebehind and upon which the swath is deposited.

The cutter bar assembly 14 includes the cutter bar portion 19 and a cutter bar support 20 extending transversely across the front of the swather. The cutter bar support may take the form of a substantially triangular member when viewed in end elevation and illustrated in FIG. 4.

A support boxing 21 is secured to the underside of the cutter bar support 20 and, in this embodiment, includes a forwardly extending plate 22, a rearwardly extending diagonal plate 23, and a rear diagonal member 24 together with a short horizontal base portion 25.

A reel assembly collectively designated 26 is supported by this boxing 21 and in the present embodiment, includes a pair of side arms 27 one upon each end of the reel assembly, pivotally secured by the front ends thereof to the junction between the members 24 and 25 of the support boxing. A strap 28 may extend from adjacent the rear ends 29 of the side arms 27 and may be adjustably connected to a rearwardly extending support 30, by means of nut and bolt assemblies 31 extending through any one of a plurality of apertures 32 so that the height of reel assembly can be adjusted, within limits, relative to the ground illustrated by reference character 33.

It will be appreciated that the reel assembly 26 is raised and lowered with the cutter bar assembly 14 so that some adjustment for the reel height is desirable.

The reel collectively designated 34, and which will hereinafter be described, includes a curved upper plate 35 secured by the front edge 36 thereof to the front end of he side arms 27 and curving over to be secured by the rear edge thereof to the rear ends 29 of the side arms 27 and an arcuately curved shroud 37 is secured by the front edge 38 thereof to adjacent the upper side of the cutter bar support 30 and curves over to meet the curved plate 35 along a line indicated by reference character 39 in FIG. 2. This receives the swath from the upper sides of the canvases 16 whereupon it slides by gravity over the shroud 37 and curved component 35 onto the treated stubble therebehind. In this connection a plurality of spaced and parallel fingers 40 may extend from the rear edge of the curved cover 35, rearwardly and downwardly so that the swath may be deposited gently upon the upper ends of the treated stubble.

The stubble conditioning assembly includes a centrally located reel member 41 which, in this embodiment, takes the form of a shaft journalled for rotation within bearings 42 in each of the side members or arms 27 with one end of the shaft extending beyond the bearing 42 and having a belt pulley 43 secured thereto.

A drive belt 44 extends from this pulley and around a further pulley 45 secured to a drive shaft 46 extending from a source of power in the form of a small gasoline engine 47. This may be supported upon a support plate 48 extending rearwardly of the swather and includes a sliding assembly adjusted by means of handle 49 for tightening and loosening belt 44. However as such an assembly is conventional, it is not believed necessary to describe same further.

Extending radially from the shaft 41 is a plurality of cutting and conditioning members collectively designated 50 and these extend along the length of shaft 41 between the side members or plates 27. These components collectively designated 50 each include a support or arm 51 secured by one end thereof to the shaft 41 and extending radially therefrom.

FIG. 6 shows the support 51 being apertured as at 52 so that it can be bolted to the shaft whereas FIG. 7 shows the preferred embodiment in which the upper end is enlarged and provided with a bore 53 so that it can be engaged over the shaft and tightened in the desired position by means of set screw or bolt 54.

In either embodiment, a cutter and conditioning portion collectively designated 55 is secured or formed upon the distal end of the support 51 and extends transversely thereof substantially parallel to the shaft 41. The shaft together with the components 50 rotate in the direction of arrow 56 and include a sharpened front or leading edge 57 and a conditioning heel or trailing portion 58 and it will be observed that the heel or trailing portion 58 extends beyond the cutting edge 57 and beyond the circle described thereby. The leading cutting edges 57 cut the stubble swept thereby and the conditioning heel portion 58 batters and distorts the upper ends of this cut stubble as illustrated schematically in FIG. 6 by reference character 59 thus forming a platform upon which the swath is deposited and assisting in maintaining the swath 60 upon the cut stubble, the height of which is below the stubble 61 on either side of the cut and treated stubble.

If desired, the length of the supports 51 may be increased from the center of the shaft 41 towards either end thereof so that the cut and treated stubble presents a crown as illustrated in FIG. 6 thus assisting in the formation of the swath and air circulation thereunder. It will be noted that the swath 60 is substantially below the upper ends of the surrounding stubble 61 so that it is sheltered and reduces the possibility of the swath being lifted by high winds.

Advantages flowing from the conditioning of the stubble prior to laying the swath include reduced material other than grain (i.e. straw) resulting in much better straw walker efficiency.

Other advantages of less straw include less concave wear for the combine, less cylinder bar wear and an increased in capacity of the combine which of course leads to fuel savings and less engine wear.

Furthermore better straw chopper efficiency is provided as it requires less power to operate same and better sieve function is also provided with less wind being needed with stick straws and white caps.

In the swathing operation, there is less straw in the swath giving much faster curing and faster dry out after rain.

Protection of the swath from wind is also provided because the swath is situated below the average stubble line.

Natural mounding of the swath may be provided by the crowned effect of the treated stubble and better support of the swath is provided by the conditioning of the upper ends of this cut stubble as hereinbefore described.

It has been found with the swath protected, higher air temperatures are encountered below the stubble line and a certain stubble height control can be obtained with the adjustability of the reel relative to the cutter bar assembly.

This enables the cutter bar assembly to be raised higher than normal thus reducing cutter bar damage and giving less straw to the swath.

The rows of conditioned stubble, after combining, and being situated below the levels of the surrounding stubble give excellent moisture conservation in winter and better control of spring runoff. Easy disking and incorporation of standing stubble is obtained with less loose straw to handle.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. In a swather which includes a frame, a transverse cutter bar assembly for cutting a swath including a transverse cutter bar support member, a canvas assembly, and a swath discharge area at one end of the canvas of said canvas assembly; the improvement comprising a stubble conditioning assembly below said swath discharge area for conditioning the tops of the stubble over which the swath is to be deposited, said swather conditioning assembly including a horizontally located stubble cutting and conditioning reel component journalled for rotation within and below the swath discharge area and means supporting said reel component from the frame of the swather, said conditioning reel component including swather guide shield means over the upper side thereof for receiving the swath from the swath discharge area and depositing same upon the conditioned stubble therebehind, and means operatively connecting said reel to a source of power, said shield means curving rearwardly and downwardly over part of said reel component.

2. The invention according to claim 1 which includes a plurality of spaced and parallel, longitudinally extending, and rearwardly and downwardly extending fingers extending rearwardly from said shield means, to lay the swath upon the conditioned stubble.

3. The invention according to claim 1 in which said reel component includes side frame members and a central reel member extending between said side frame members and being supported for rotation therebetween, and a plurality of stubble cutting and conditioning members secured to said central reel member and extending radially therefrom along the length of said central reel member.

4. The invention according to claim 2 in which said reel component includes side frame members and a central reel member extending between said side frame members and being supported for rotation therebetween, and a plurality of stubble cutting and conditioning members secured to said central reel member and extending radially therefrom along the length of said central reel member.

5. The invention according to claim 3 in which each of said stubble cutting and conditioning members includes a support secured by one end thereof to said central reel member and extending radially therefrom, a portion on the distal end of said support extending transversely thereof and parallel to the central reel member, said last mentioned portion including a leading cutting edge and a trailing stubble-top conditioning heel extending beyond the radial path followed by said leading cutting edge whereby the top portion of the stubble cut by said leading cutting edge is battered and distorted by said heel.

6. The invention according to claim 4 in which each of said stubble cutting and conditioning members includes a support secured by one end thereof to said central reel member and extending radially therefrom, a portion on the distal end of said support extending transversely thereof and parallel to the central reel member, said last mentioned portion including a leading cutting edge and a trailing stubble-top conditioning heel extending beyond the radial path followed by said leading cutting edge whereby the top portion of the stubble cut by said leading cutting edge is battered and distorted by said heel.

7. The invention according to claims 5 or 6 in which the effective length of said stubble cutting and conditioning members increases from the center of said central reel member towards each end thereof thereby providing a "crowned" effect to the cut stubble.

* * * * *